Patented Sept. 14, 1937

2,092,902

UNITED STATES PATENT OFFICE 2,092,902

MANUFACTURE OF NEW PHENANTHRENE DERIVATIVES

Edward de Barry Barnett and Cyril Alec Lawrence, London, England, assignors to Imperial Chemical Industries Limited, a corporation of Great Britain No Drawing. Application May 23, 1935, Serial No. 23,132. In Great Britain May 23, 1934

9 Claims. (Cl. 260—61)

This invention relates to the preparation of new phenanthrene derivatives by combining a hydrodiphenyl in which the 2,2′ positions are not saturated, with a compound containing the grouping

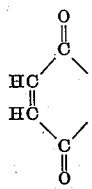

Octahydrodiphenyl will be used as an example of the hydrodiphenyl compounds which may be used in this invention. Included among the compounds having the general formula above given which may be combined with the hydrodiphenyl compounds, we would mention the para-quinones or acids such as maleic acids, their anhydrides or esters. Combination is usually effected by merely heating the compounds together.

The following examples in which parts are by weight illustrate but do not limit the invention.

*Example 1.*—A mixture of equal weights of octahydrodiphenyl (vide Wallach Liebig's Annalen 381, page 112) and α-naphthoquinone is heated just to boiling and then cooled. The resulting mass is extracted with cold acetone until colourless.

The residue is a colourless powder which gives colourless crystals from toluene, m. p. 208° with decomposition and dissolving in concentrated sulphuric acid with a purple colour. It is presumably a dodecahydrodibenzanthraquinone having the following formula

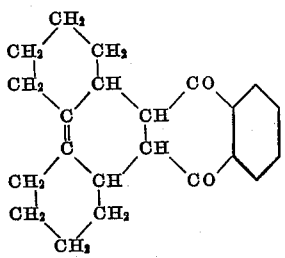

*Example 2.*—1 Part of the product of Example 1 is suspended in 25 parts of alcohol, 1 part of 5% aqueous sodium hydroxide is added and air is passed through until a red colour no longer appears after stopping the air (about 1 to 3 hours). 250 parts of water are added, and the yellow solid which precipitates is filtered off. It melts at 254° C. and crystallizes in yellow needles from toluene. The crystals dissolve in concentrated sulphuric acid with a red-brown colour. The product is presumably a decahydrodibenzanthraquinone of the following formula

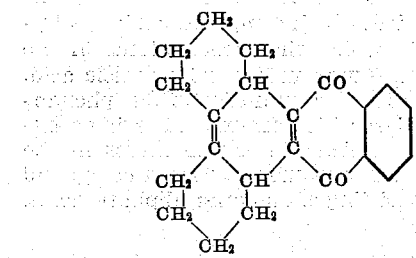

*Example 3.*—20 Parts of octahydrodiphenyl (as before) and 6 parts of p-benzoquinone are heated with shaking until the whole just boils and then cooled. The resulting gum is either extracted first with hot alcohol and then with cold acetone or is recrystallized from a mixture of benzene and acetone. The residue from the extraction or the recrystallized material is then recrystallized from xylene. There are thus obtained colourless crystals, m. p. about 315° C. (with decomposition) which dissolve in concentrated sulphuric acid with a yellowish-brown colour. The product is probably a hydro derivative of tetrabenzanthraquinone.

*Example 4.*—24 Parts of octahydrodiphenyl (as before) and 16 parts of maleic anhydride are quickly heated at about 250° C. until homogeneous and then cooled. The cold product, which is a brown resin is stirred with about 10 parts of light petroleum (b. p. 40–60° C.) cooled to 0° C., and filtered at this temperature. The residue is a pale yellow or colourless crystalline powder. It is recrystallized from a mixture of about 3 parts of benzene and 10 parts of light petroleum and gives a colourless crystalline product of m. p. 122° C., which dissolves in concentrated sulphuric acid with a brown colour, which becomes reddened on standing.

We claim:

1. The process for manufacturing phenanthrene derivatives which comprises heating a hydrodiphenyl in which the carbon atoms in the 2,2' positions are unsaturated, with a compound of the class consisting of quinones, aliphatic acids, esters and anhydrides which contain the following grouping

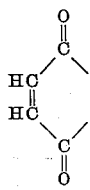

2. The process for manufacturing phenanthrene derivatives which comprises heating octahydrodiphenyl in which the carbon atoms in the 2,2' positions are unsaturated, with a compound of the class consisting of quinones, aliphatic acids, esters and anhydrides which contain the following grouping

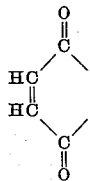

3. The process for manufacturing phenanthrene derivatives which comprises heating a hydrodiphenyl in which the carbon atoms in the 2,2' positions are unsaturated, with para-quinone.

4. The process for manufacturing phenanthrene derivatives which comprises heating a hydrodiphenyl in which the carbon atoms in the 2,2' positions are unsaturated, with maleic acid.

5. The process for manufacturing phenanthrene derivatives which comprises heating a hydrodiphenyl in which the carbon atoms in the 2,2' positions are unsaturated, with a compound of the class consisting of quinones, aliphatic acids, esters and anhydrides which contain the following grouping

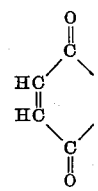

and subjecting the resulting compound to mild oxidation treatment.

6. New products obtainable by the process claimed in claim 1.

7. New compounds obtained by the process claimed in claim 5.

8. The compound of the formula

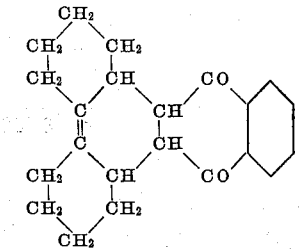
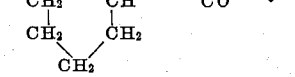

9. The compound of the formula

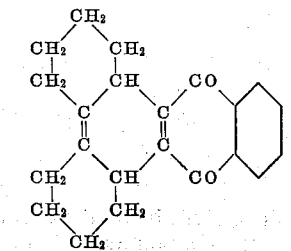

EDWARD DE BARRY BARNETT.
CYRIL ALEC LAWRENCE.